(12) United States Patent
Pasqualini et al.

(10) Patent No.: US 7,760,208 B2
(45) Date of Patent: Jul. 20, 2010

(54) NON-LINEAR PICTURE PROCESSING

(75) Inventors: Giuseppe Pasqualini, Monza (IT); Carlo Casale, Busto Arsizio (IT)

(73) Assignee: Koninklijke Philips Electronics N.V., Eindhoven (NL)

( * ) Notice: Subject to any disclaimer, the term of this patent is extended or adjusted under 35 U.S.C. 154(b) by 967 days.

(21) Appl. No.: 10/521,131

(22) PCT Filed: Jul. 10, 2003

(86) PCT No.: PCT/IB03/03118

§ 371 (c)(1), (2), (4) Date: Jan. 12, 2005

(87) PCT Pub. No.: WO2004/008778

PCT Pub. Date: Jan. 22, 2004

(65) Prior Publication Data

US 2005/0248551 A1 Nov. 10, 2005

(30) Foreign Application Priority Data

Jul. 17, 2002 (EP) ................... 02077884

(51) Int. Cl.
G09G 5/02 (2006.01)

(52) U.S. Cl. .................................... 345/589

(58) Field of Classification Search .................. 345/589
See application file for complete search history.

(56) References Cited

U.S. PATENT DOCUMENTS

| 4,731,662 | A | * | 3/1988 | Udagawa et al. | 358/530 |
| 5,204,948 | A | * | 4/1993 | Kato | 358/520 |
| 5,436,673 | A | * | 7/1995 | Bachmann et al. | 348/645 |
| 5,724,456 | A | * | 3/1998 | Boyack et al. | 382/274 |
| 5,742,296 | A | * | 4/1998 | Yamada et al. | 345/604 |
| 5,809,164 | A | * | 9/1998 | Hultgren, III | 382/162 |
| 6,031,543 | A | * | 2/2000 | Miyashita et al. | 345/593 |
| 6,049,626 | A | * | 4/2000 | Kim | 382/167 |
| 6,078,686 | A | * | 6/2000 | Kim | 382/167 |
| 6,154,217 | A | * | 11/2000 | Aldrich | 345/589 |
| 6,664,973 | B1 | * | 12/2003 | Iwamoto et al. | 345/589 |

OTHER PUBLICATIONS

International Telecommunications Union, ITU-R BT.601-6, pp. 1-5.*

* cited by examiner

Primary Examiner—Xiao M Wu
Assistant Examiner—Edward Martello

(57) ABSTRACT

The present invention provides a method of picture processing for a display device, characterized by the steps of processing input picture signals (R,G,B) in a non-linear manner so as to produce output picture signals (R',G',B') for the device, such non-linear processing being responsive to parameters (Y,S,H) of the input picture signals (R,G,B).

10 Claims, 6 Drawing Sheets

NON-LINEAR PICTURE PROCESSING

The present invention relates to picture signal processing and, in particular, but not exclusively, to adaptive improvement of picture quality.

Although high quality display devices are currently available for displaying, for example, video and computer-generated images, limitations nevertheless still exist particularly with digital displays such as LCD display panels and monitors. It is therefore recognized that there is further room for improvement of image quality and it is appreciated that image quality could be noticeably improved by achieving increases in color saturation. However, display devices commonly exhibit a maximum acceptable saturation value and it has been found that, while some areas of a displayed image, with particular colors, might well be at, or near, their maximum saturation value, other areas with different colors might still be somewhat below such a maximum value.

Yet, furthermore, and particularly with current digital LCD monitors, relatively few picture adjustments are available to the user. Most frequently, picture contrast and brightness can be adjusted, while saturation, hue and color temperature are less frequently available. In such digital displays, each pixel is driven by a triplet of values wherein each one represents the intensity of one of the three colors red, green and blue. However, due to the finite number of bits serving to represent each color value, the possible driving values are likewise limited. For example, in a 24-bit LCD display panel, each color can be driven with any value included within a range of 0 to 255. Thus, if there is an attempt, either through some form of picture processing, or indeed user control, to increase the output to above the maximum allowed value, a clipping effect will result, causing all the driving levels above the threshold to be represented by the same value, i.e. the maximum saturation value. Thus, some picture detail which is quite clearly present in the input picture signal will therefore be lost through the amalgamations of the saturation levels caused by such a clipping effect.

It is an object of the invention to enhance images. The invention is defined by the independent claims. The dependent claims define advantageous embodiments.

According to one aspect of the present invention, a method of non-linear processing of input picture signals is characterized in that the non-linear processing is responsive to hue values of the input picture signals.

It is a particular advantage that the processing can serve to limit, or indeed avoid, any clipping of the output signal. This can be achieved by increasing the saturation up to a maximum level, at which clipping does not yet take place. Use is made of, amongst others, the hue values to determine this maximum level.

The invention has the advantage that, for example, color saturation of the output picture signals can thereby be controlled in a manner avoiding loss of picture detail, because the color saturation is increased more for picture areas showing low saturation levels than for picture areas showing high saturation levels. The clipping effect discussed above is therefore advantageously avoided.

The set of input parameter values preferably comprises the saturation values, as an increase of the saturation considerably enhances the image to be displayed.

Alternatively, adaptations of the brightness values can be applied. By suitably combining adaptations of saturation values as well as brightness values, there will be no undesired discoloration of the image.

A simple method of non-linear processing is raising the parameter values to a certain power. By selecting a power depending on the hue values, the non-linear processing takes into account that the output picture signals show no (or a negligible) clipping effect.

The non-linear processing can further be refined (in the sense of, for example, maximizing the saturation, while avoiding or minimizing clipping), by taking into account the maximum saturation value $S_{max}$ during the non-linear processing of the saturation values.

It is advantageous if the maximum saturation value $S_{max}$ is dependent on the hue values or the output parameter values corresponding to the brightness (preferably depending on both hue values as well as on output brightness values).

The powers used in the non-linear processing can also be made dependent on the content of the image, represented by a histogram of one or more sets of input parameter values. This is a further refinement to adapt the non-linear processing in such a way that, for example, saturation is further increased, while clipping effects are further minimized.

In the case of input picture signals representing real-time video information, the video information can be considered as a sequence of images. Each image has its own histogram. The powers can be adapted directly, depending on the content of the histogram, or alternatively, a more gradual change can be applied by adapting the powers based on an averaging over several images (low-pass filtering) of the changes of the powers. In this way, irregularities are avoided, which would arise from sudden large changes of the powers from image to image.

Thus, it should be appreciated that, with the present invention, the saturation and/or the brightness of each pixel within a display can be modified in a non-linear manner that serves to introduce significant enhancements where the input picture signals have low saturation values, less significant enhancements where the saturation values of the input signals are close to their maximum limits, and no changes where the input signals already have maximum saturation values.

These and other aspects of the invention are apparent from and will be elucidated with reference to the drawings in which.

Figure 2:
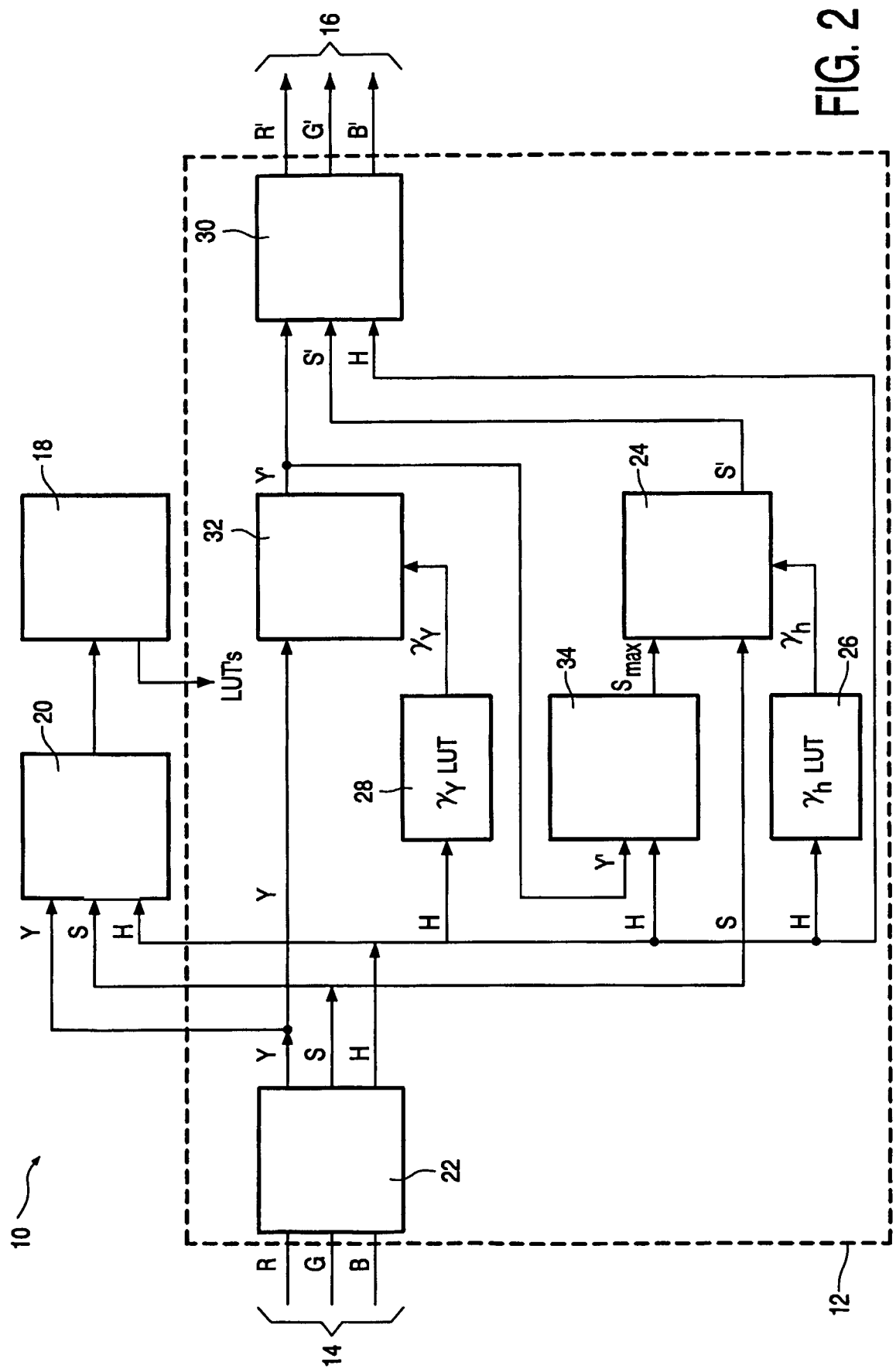
FIG. 2 is a schematic block diagram showing the system of FIG. 1 in further detail.
Figure 6A:
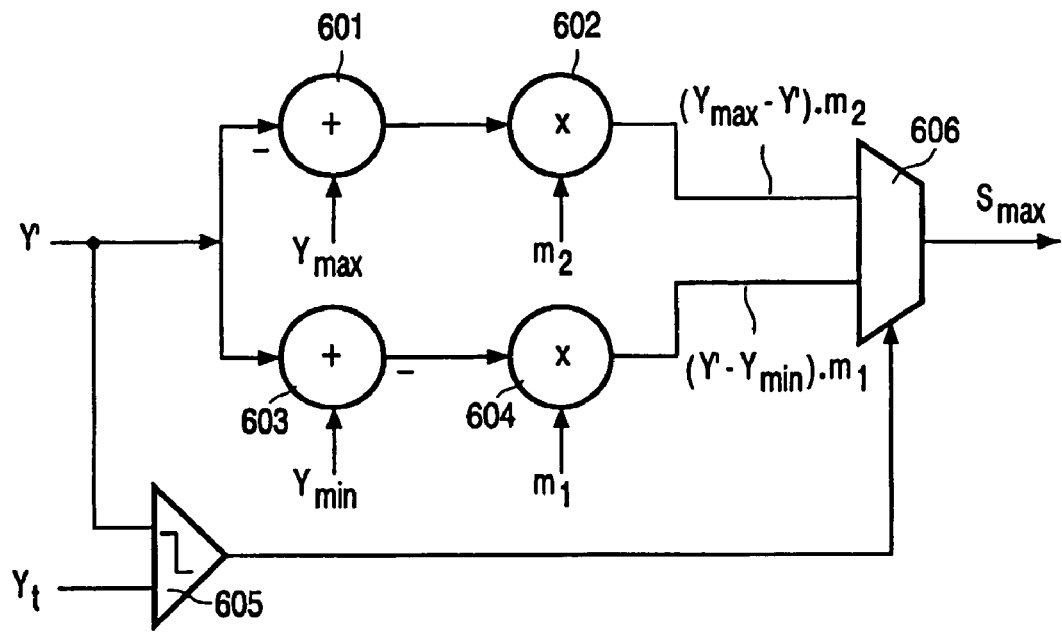
Figure 6B:
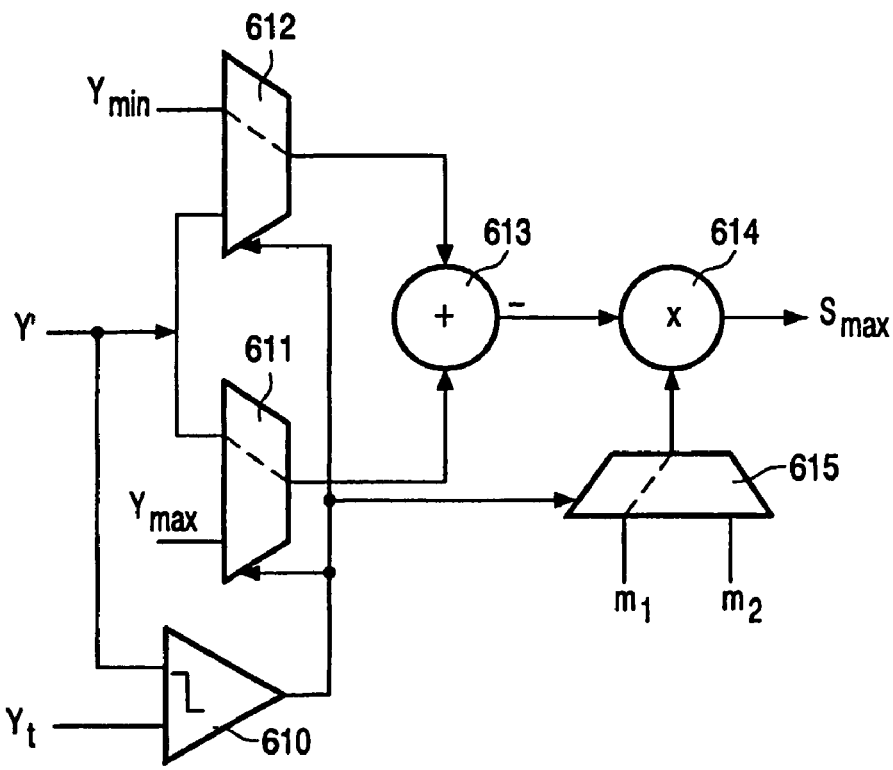
Figure 7:
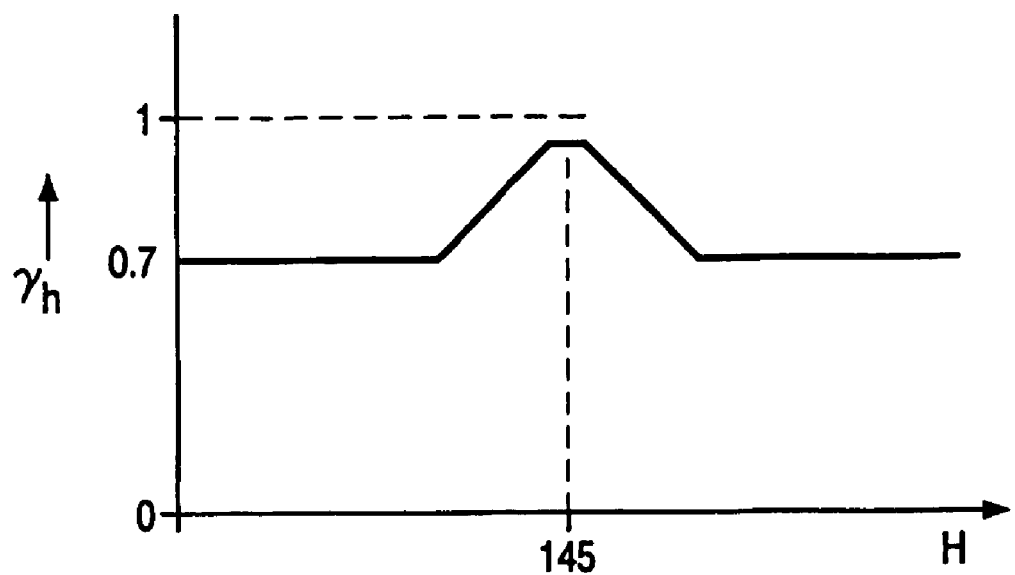

FIGS. 6a and 6b comprise schematic block diagrams of a hardware implementation of the saturation bound evaluation block of FIG. 2; and FIG. 7 illustrates suitable values for the power $\gamma_h$.

Figure 8:
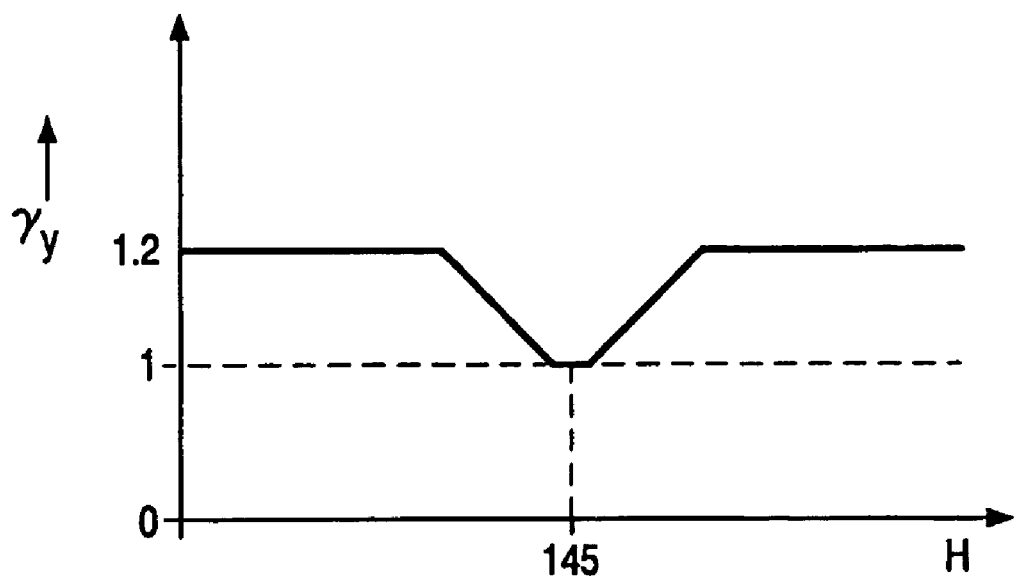

FIG. 8 illustrates suitable values for the other power $\gamma_y$.

Figure 1:
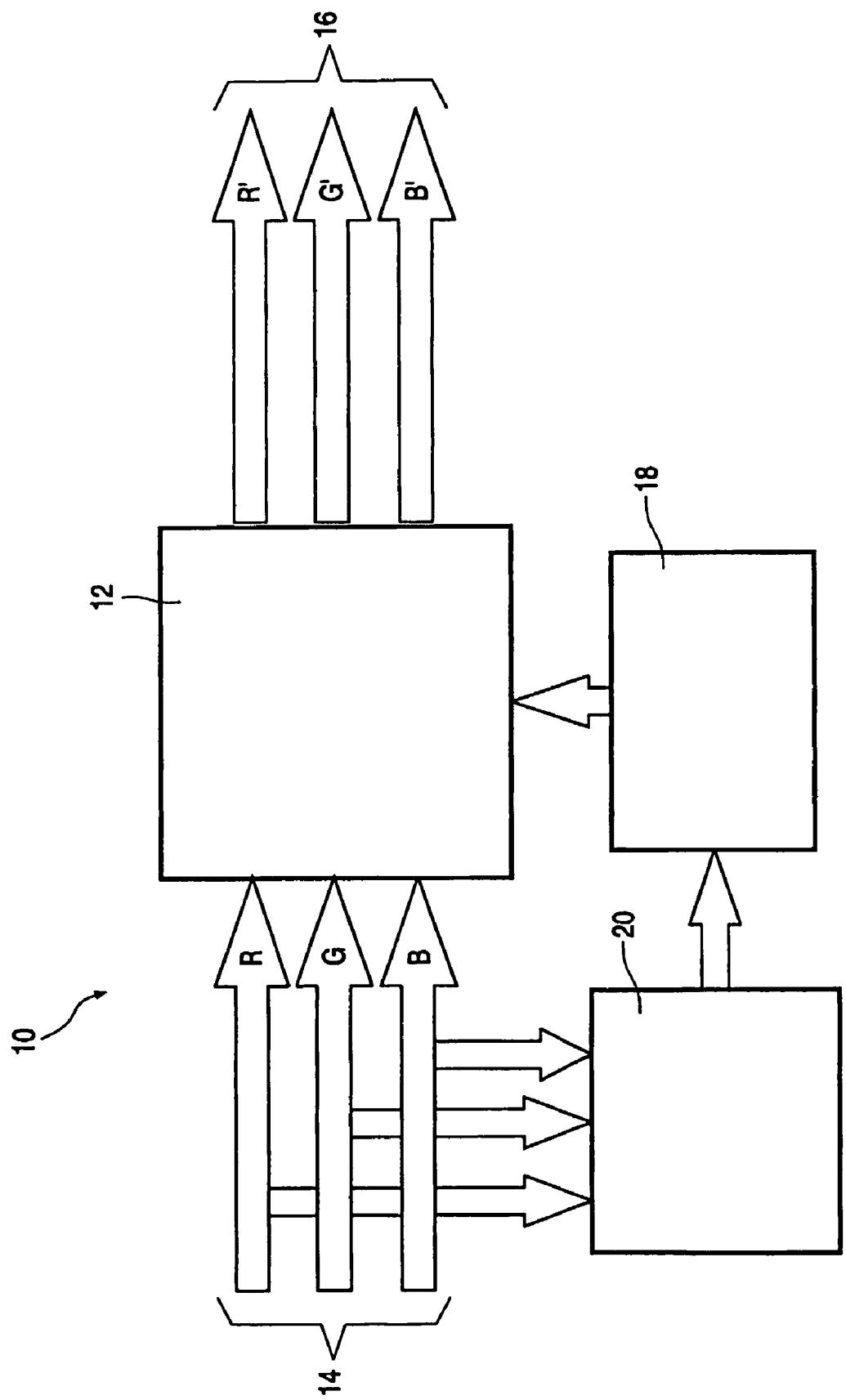
FIG. 1 is a basic block diagram of a system embodying the general concept of the present invention.

FIG. 1 shows a generic block diagram illustrating a system 10 arranged to drive a display device in accordance with an embodiment of the present invention and which includes a non-linear processing engine 12 arranged to receive red, green and blue input pictures signals 14 and, once processed, to output red, green and blue output picture signals 16 for a display device such as an LCD panel. The operation of the non-linear processing engine 12 is controlled by means of a microcontroller 18 which is itself responsive to signals from a histogram evaluator 20 which samples the red, green and blue input picture signals 14 or parameters derived from these signals (not shown). In this illustrated example, the histogram evaluator 20 works on brightness, saturation and hue values of the input picture signals, as will be further illustrated with reference to FIG. 2. Of course, the Figures illustrate merely one possible implementation of the present invention. The picture signals 14 represent an image composed of a matrix of rows and columns of pixels. The red, green and blue picture signals 14, 16 comprise information in a digital format about the red, green and blue color components of the pixels of an image. In the case of real-time video signals, these signals are handled as a sequence of images. The processing can be applied to each of these images.

FIG. 2 illustrates, in somewhat greater detail, one possible embodiment of FIG. 1 and each of the processing blocks illustrated therein will now be discussed in turn.

A first converter block 22 serves to convert the Red R, Green G and Blue B input picture signals 14 into Brightness Y, Hue H, and Saturation S parameter values.

In the illustrated embodiment, this block can be split functionally into two sub-blocks, i.e. a linear transformation accomplished through a matrix followed by a non-linear block.

By means of the linear block, Brightness Y and chromaticity coordinates $C_r$, $C_b$ are computed as follows for all pixels:

$$\begin{bmatrix} Y \\ C_r \\ C_b \end{bmatrix} = \begin{bmatrix} a_{11} a_{12} a_{13} \\ a_{21} a_{22} a_{23} \\ a_{31} a_{32} a_{33} \end{bmatrix} \begin{bmatrix} R \\ G \\ B \end{bmatrix},$$

wherein the matrix $a_{i,j}$ comprises a predetermined set of parameters, which depend on the color coordinates of the display device to be driven. This computation can be executed in hardware by using three multipliers and three adders for each row.

The saturation S and hue values H for a pixel are then defined by the following formulae:

$$S = (C_r^2 + C_b^2)^{1/2}$$

$$H = \tan(C_r/C_b).$$

These functions can be implemented in several ways, for example, by using Look Up Tables (LUTs) and/or hardware interpolators.

A non-linear saturation processing block 24 is arranged to receive maximum saturation values $S_{max}$ and the saturation values from the converter 22. The way in which the maximum saturation value $S_{max}$ is determined for a pixel will be explained hereinafter. In the illustrated embodiment, a non-linear function in the form of a gamma function is employed as follows:

$$S' = S_{max}(S/S_{max})^{\gamma_h},$$

wherein S' is the output parameter of the output picture signals 16 corresponding to the saturation and $\gamma_h$ is the power used in this non-linear processing.

The transfer function can be rearranged in this form:

$$S' = 2^{\gamma_h[\log_2(S) - \log_2(S_{max})] + \log_2(S_{max})}$$

Figure 3:
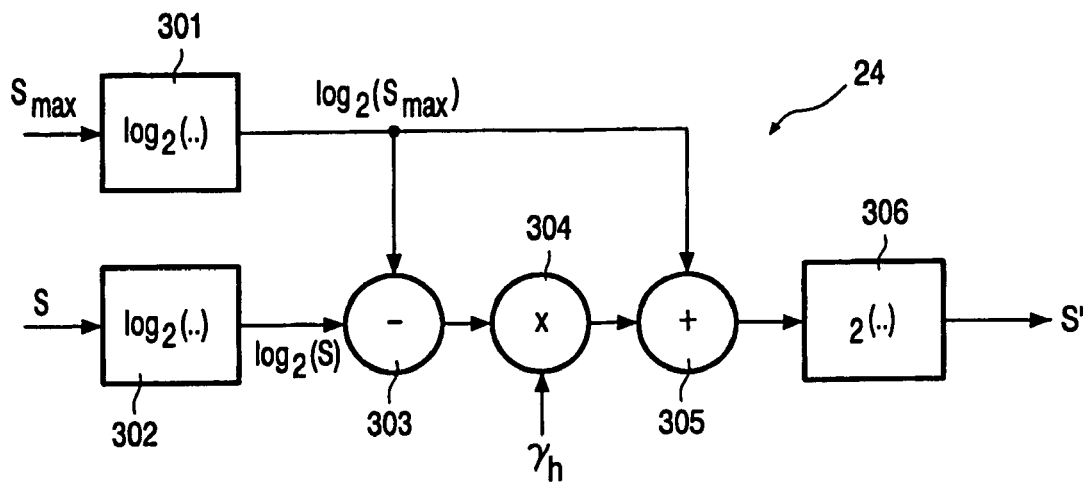
FIG. 3 is a schematic block diagram illustrating one particular implementation of the non-linear saturation processing block of FIG. 2.

This function can be implemented in several ways, for example, using LUTs and multipliers. One possible embodiment is illustrated in FIG. 3.

First, the logarithm of the saturation S and maximum saturation value $S_{max}$ is determined in respective logarithmic blocks 302, 301. Then, the results are subtracted in subtractor 303. The output of the subtractor 303, being $\log_2(S) - \log_2(S_{max})$, is multiplied by the power $\gamma_h$ in multiplier 304. The output of the multiplier 304 is added to the output $\log_2(S_{max})$ of block 301 in adder 305. The output of the adder 305 is used as power in exponential block 306, wherein the number two is raised to this power. The result, present at the output of exponential block 306, is the output saturation value S'.

A saturation bound evaluation block 34 receives both the hue values H from the converter 22 and the output brightness value Y' from the luminance-processing block 32.

Figure 5A:
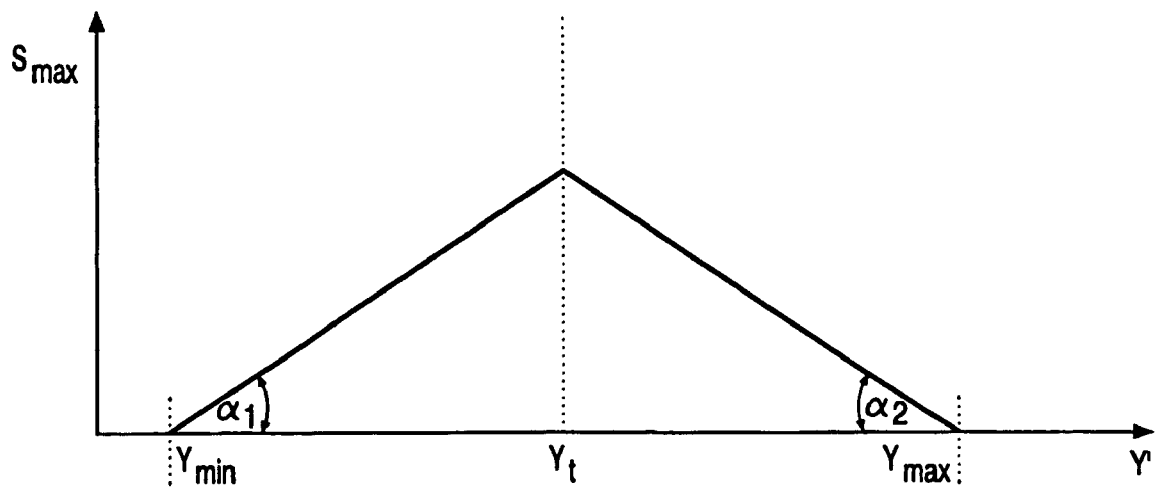
FIG. 5a illustrates a graphical representation between maximum saturation and brightness for a given hue.

The graph of FIG. 5a illustrates a typical relationship between the maximum saturation values $S_{max}$ and the brightness values Y for a given Hue value H. Intermediate parameters $m_1$, $m_2$ and $Y_t$ are functions of the hue values H. These values can be readily obtained from a LUT. Intermediate parameters $m_1$ and $m_2$ are defined as a tangent of the respective angles $\alpha_1$ and $\alpha_2$ as shown in FIG. 5a:

$$m_1 = tg(\alpha_1)$$

$$m_2 = tg(\alpha_2)$$

Figure 5B:
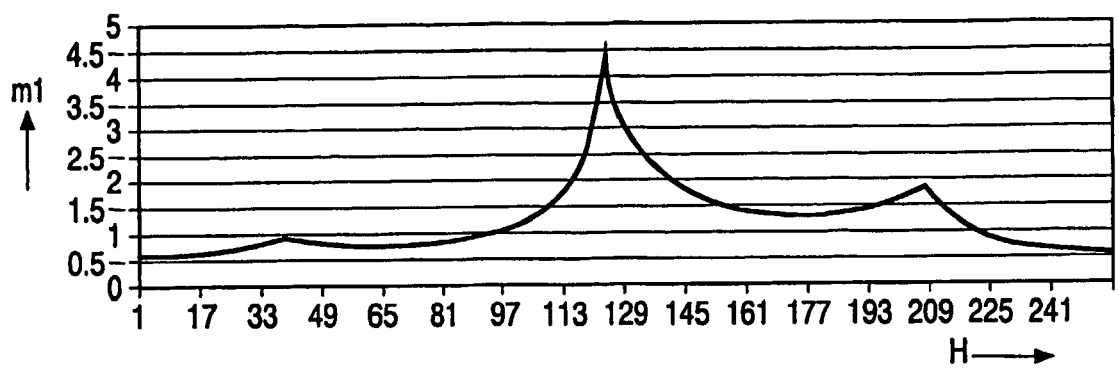
FIGS. 5b to 5d illustrate suitable values for intermediate parameters.
Figure 5C:
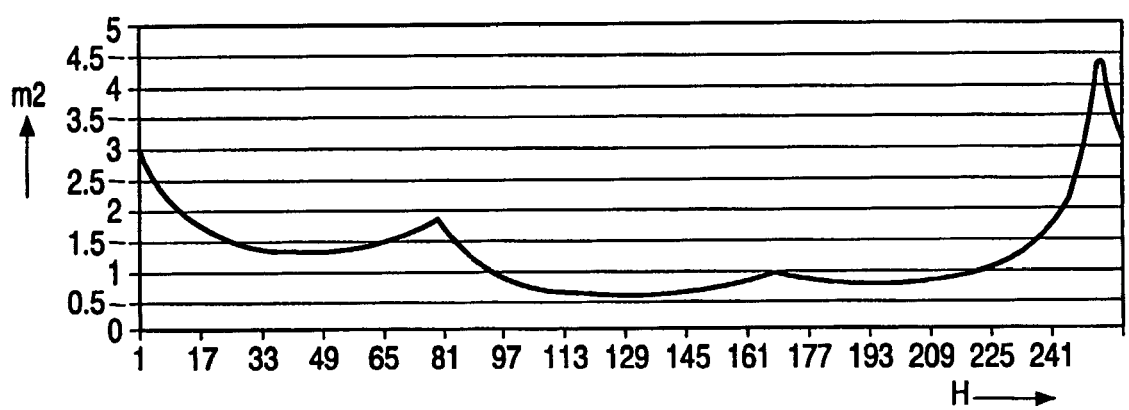
Figure 5D:
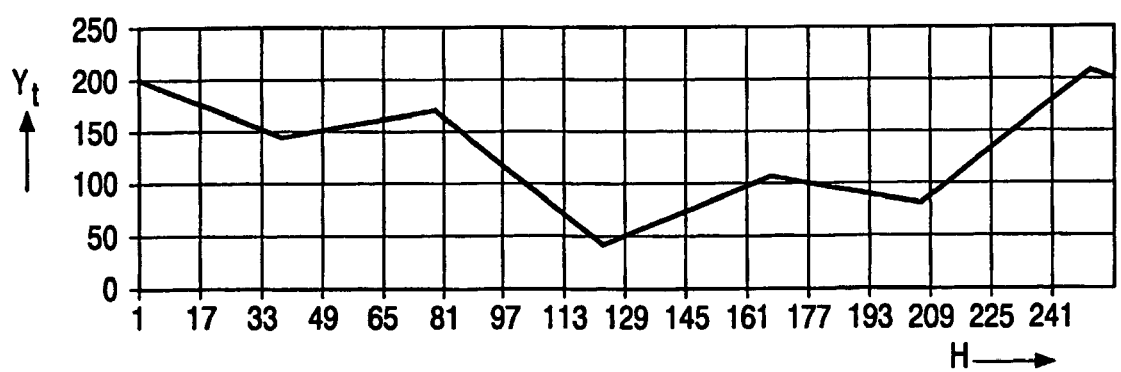

In FIG. 5b, 5c, 5d suitable values for the respective intermediate parameters $m_1$, $m_2$ and $Y_t$ are provided. These suitable values have experimentally been found in a situation, where the input parameter values are available in an eight-bit digital format (resulting in 256 possible different values) and the matrix $a_{ij}$ comprises the following values:

| | | |
|---|---|---|
| $a_{11} = 66$ | $a_{12} = 129$ | $a_{13} = 25$ |
| $a_{21} = -38$ | $a_{22} = -74$ | $a_{23} = 112$ |
| $a_{31} = 112$ | $a_{32} = -94$ | $a_{33} = -18$ |

When applying this matrix $a_{ij}$, the minimum brightness value $Y_{min}$ (as shown in FIG. 5a) is equal to zero, while the maximum brightness value $Y_{max}$ amounts to 220.

A block diagram of a possible hardware implementation of the saturation bound evaluation block 34 is given in FIG. 6a. A first branch computes the function $(Y_{max} - Y')\cdot m_2$ by means of first subtractor 601 and first multiplier 602. A second branch computes the function $(Y' - Y_{min})m_1$ using second subtractor 603 and second multiplier 604. Comparator 605 determines whether Y' is larger or smaller than $Y_t$. If Y' is larger than $Y_t$, multiplexer 606 selects $(Y_{max} - Y')m_2$ as output. If Y' is smaller than $Y_t$, multiplexer 606 selects $(Y' - Y_{min})m_1$ as output. In this way, the output of the multiplexer 606 corresponds to the desired maximum saturation values $S_{max}$ as a function of the output brightness values Y' as shown in FIG. 5a.

The intermediate parameters $m_1$, $m_2$ and $Y_t$ are obtainable from LUTs, which receive the hue value H as input (not shown in FIG. 6a). These LUTs contain the intermediate parameters as shown in the graphs of FIGS. 5b, 5c, 5d.

An alternative block diagram of a possible hardware implementation of the saturation bound evaluation block 34 is given in FIG. 6b. The comparator 610 determines again whether Y' is larger than $Y_t$:

If not, the multiplexers 611, 612, 615 select as output the input values present at the input indicated by the dotted lines inside the multiplexers 611, 612, 615.

If yes, the multiplexers 611, 612, 615 select the input values present at the other inputs.

As a result, $(Y' - Y_{min})$, or $(Y_{max} - Y')$, respectively, will be present at the output of the subtractor 613.

The multiplier 614 multiplies the mentioned outputs of subtractor 613 by $m_1$, $m_2$, respectively, depending on the output of comparator 610.

The multiplexer 615 selects $m_1$, $m_2$, respectively, depending on the output of comparator 610. The resulting output of the multiplier 614 is again the desired maximum saturation value $S_{max}$:

$$S_{max} = (Y' - Y_{min})m_1, \text{ if } Y' \leq Y_t$$

$$S_{max} = (Y_{max} - Y')m_2, \text{ if } Y' > Y_t$$

As mentioned before, the intermediate parameters are obtainable from LUTs.

A $\gamma_h$ LUT block 26 receives the hue values H from the converter 22. The $\gamma_h$ value can comprise a function of hue. In this way, it is possible to apply different color saturation processing depending on the hue values H. This can be realized easily by using a LUT. An example of suitable values of the power $\gamma_h$ as a function of the Hue values H is given in FIG. 7. The power $\gamma_h$ shows larger values (close to one) within a limited range of hue values H. This limited range includes, for example, the hue values H around 145 corresponding to skin colors. The human eye is very sensitive to these colors and an increase of saturation would result in "unnatural" images. By reducing the degree of non-linear processing (by selecting powers closer to one) for these skin colors, this problem is avoided. Outside the limited range, a considerable "boosting" of the colors is obtained by applying, for example, a value of 0.7 for $\gamma_h$.

Turning back to FIG. 2, a non-linear luminance processing block 32 is arranged to receive the brightness value Y from the converter 22.

In this embodiment, a non-linear function, using another power $\gamma_Y$ is applied wherein the output brightness value Y' is provided by the function:

$$Y' = Y^{\gamma_Y}$$

The transfer function can be rearranged in the following form:

$$Y' = 2^{\gamma_Y[\log_2 Y]}$$

Figure 4:
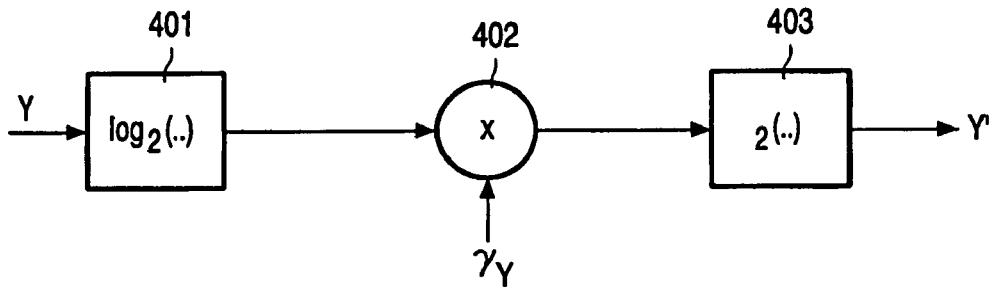
FIG. 4 is a schematic block diagram of the non-linear luminance processing block of FIG. 2.

The above function can be realized, for example, as shown in the hardware block diagram of FIG. 4. The logarithm of the input brightness value Y is determined in the logarithmic block 401. The output of the logarithmic block 401 is multiplied by the other power $\gamma_Y$ in multiplier 402. The output of multiplier 402 is used as power in the exponential block 403 to raise the number two to this power. The result present at the output of the exponential block 403 is the output brightness value Y'. An alternative for the above hardware block diagram is to apply LUTs.

In FIG. 2, a $\gamma_Y$ LUT Block 28 also receives the hue values H from the converter 22. The $\gamma_Y$ value can also comprise a function of hue, and so it is possible to apply different brightness processing depending on the hue values H. This can be easily realized by way of an appropriate LUT. An example of suitable values of the other power $\gamma_Y$ as a function of the hue values H is given in FIG. 8. The other power $\gamma_Y$ shows a value close to one within a limited range of the hue values H (around 145). Again, in this range, the degree of non-linear processing is reduced (or made zero) in order to avoid unnatural skin colors. Outside this range, the other power $\gamma_Y$ preferably has a value larger than one, for example 1.2.

In FIG. 2, a YHS to RGB converter 30 comprises the last block in the signal flow path and serves to convert the output parameter values Y', S', H to the output picture signals R'G'B'.

This block can be implemented by cascading a non-linear transformation function for obtaining output chromaticity coordinates Cr' and Cb' from the output saturation values S' and hue values H, followed by a linear transformation converting these coordinates in output picture signals R', G' and B'.

The formulae for computing output coordinates Cr' and Cb' are:

$$Cr' = S' \sin(H) \quad Cb' = S' \cos(H)$$

The functions sin(H) and cos(H) can be implemented through Look Up Tables and interpolators.

Furthermore, the values of output picture signals R', G', B' can be computed by multiplying Y', $C_r'$, $C_b'$ by an appropriate matrix $b_{ij}$ as shown below.

$$\begin{bmatrix} R' \\ G' \\ B' \end{bmatrix} = \begin{bmatrix} b_{11} & b_{12} & b_{13} \\ b_{21} & b_{22} & b_{23} \\ b_{31} & b_{32} & b_{33} \end{bmatrix} \begin{bmatrix} Y' \\ C_r' \\ C_b' \end{bmatrix},$$

wherein the matrix $b_{ij}$ comprises a predetermined set of parameters depending on the color coordinates of the display device. The function requires three multipliers and three adders for each matrix row.

The non-linear processing can also be made dependent on the distribution of the input parameter values Y, S, H of an image. This distribution can be evaluated by using a histogram evaluator 20 as shown in FIG. 2. The evaluator 20 receives the input parameter values Y, S, H and determines the number of occurrences of combinations (triplets) of input values Y, H, S in an area (a "window") of an image (or in the whole image).

Depending on the distribution the powers $\gamma_Y$ and $\gamma_h$ can be adapted in the $\gamma_Y$ LUT 28 and $\gamma_h$ LUT 26, respectively, via micro-controller 18. As a result, the degree of non-linear processing can be adapted in dependence on the distribution. Since the main goal is to adapt the color saturation of an area of an image for a given hue value H, a suitable parameter to use is the average saturation value $\overline{S}(Y)|_H$, which is a function of the input brightness value Y.

This average saturation value $\overline{S}(Y)|_H$ as a function of input brightness values Y can be derived from the histogram $\Omega(Y, H, S)$ as follows:

$$\overline{S}(Y)\big|_H = \sum_i S_i \Omega\big|_H (Y, S_i),$$

wherein $\Omega_H$ is the histogram for a given hue value H, i is an index for the range of possible input saturation values S' and $S_i$ is the i-th possible input saturation value. In the case of 8-bit digital input picture signals, the range of i is 256.

A refinement can be applied by taking into account a weighing factor W(Y,H), that weighs the average saturation values $\overline{S}(Y)|_H$ depending on the maximum possible saturation values for a given input brightness value Y.

Taking into account the weighing factor W(Y,H), the weighed average saturation value becomes:

$$\overline{S}'(Y)\big|_H = W(Y, H)\overline{S}(Y)\big|_H = \frac{\overline{S}(Y)\big|_H}{S_{max}(Y, H)}$$

As a subsequent step, a parameter $\psi|_H$, being a weighed average hue saturation value for a given hue value, can be computed from the expression:

$$\psi\big|_H = \sum_j Y_j \overline{S}'(Y_j)\bigg|_H,$$

wherein j is an index for the range of possible input brightness values Y.

The weighed average hue saturation value $\psi|_H$ related to an area of an image can be used to adapt the degree of non-linear processing by adapting the power $\gamma_h$.

In the case of video information with changing areas in an image or changing images, the value $\psi|_H$ is determined for each image of the video information. The current value $\psi|_H$ is compared with a user-adjustable target value $\psi_T|_H$.

If the current value $\psi|_H$ deviates from the target value $\psi_T|_H$, an error signal, proportional to the difference of the 2 values, is used to adapt the power $\gamma_h$. By applying a low-pass filtering on the error signal, abrupt changes of the power $\gamma_h$ due to changing video information are avoided.

In this way, disturbing effects are avoided, when the output picture signals are displayed on the display device.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. Use of the article "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of non-linear processing of at least one set of luminance, saturation, and hue parameter values of input picture signals so as to produce output picture signals based on the hue parameter value and an output luminance parameter value and an output saturation parameter value, wherein the method comprises the steps of:
    receiving input picture signals;
    determining, using a matrix converter block, input luminance, saturation and hue parameter values of said input picture signals;
    obtaining the output saturation parameter value by increasing the input saturation parameter value up to a maximum level in a saturation processing block; and
    determining said maximum level using the input hue value and the output luminance parameter value in a saturation bound evaluation block such that clipping of a color driving value does not take place.

2. The method as claimed in claim 1, wherein the non-linear processing comprises the steps of:
    determining a power depending on the hue parameter values; and
    raising the input saturation parameter value to the power.

3. The method as claimed in claim 2, wherein said method further comprises the step of:
    adapting the power based on histogram data derived from one or more of the input parameter values.

4. The method as claimed in claim 1, wherein the non-linear processing comprises the steps of:
    determining a power depending on the hue parameter value; and
    raising the input luminance parameter value to the power.

5. The method as claimed in claim 4, wherein said method further comprises the step of:
    adapting the power based on histogram data derived from one or more of the input parameter values.

6. The method as claimed in claim 1, wherein the maximum level depends on the output luminance parameter value.

7. The method as claimed in claim 2, wherein the output saturation parameter value is substantially determined by the equation:

$$S' = S_{max}(S/S_{max})^{\gamma_h},$$

where S is the saturation parameter value, $S_{max}$ is the maximum saturation value, and $\gamma_h$ is the power.

8. The method as claimed in claim 3, wherein, for a predetermined hue parameter value, the power is adapted on the basis of a weighed average input saturation parameter value of the input picture signals, representing pixels in a window of an image.

9. The method as claimed in claim 8, wherein, for a predetermined hue parameter value, the power for a current window is dependent on the histogram data of a current and/or a previous window.

10. An apparatus for non-linear processing of at least one set of luminance, saturation, and hue parameter values of input picture signals so as to produce output picture signals based on the hue parameter value and an output luminance parameter value and an output saturation parameter value, the apparatus comprising:
    means for receiving input picture signals;
    means for determining input luminance, saturation and hue parameter values of said input picture signals;
    means for obtaining the output saturation parameter value by increasing the input saturation parameter value up to a maximum level; and
    means for determining said maximum level using the input hue value and the output luminance parameter value such that clipping of a color driving value does not take place.

* * * * *